(No Model.) 4 Sheets—Sheet 1.

F. H. RICHARDS.
WEIGHING MACHINE.

No. 600,044. Patented Mar. 1, 1898.

Fig. 1.

Witnesses: Inventor:

(No Model.) 4 Sheets—Sheet 2.

F. H. RICHARDS.
WEIGHING MACHINE.

No. 600,044. Patented Mar. 1, 1898.

Fig. 2.

Witnesses:
B. G. Hewitt
Henry Bissell

Inventor.
F. H. Richards.

(No Model.) 4 Sheets—Sheet 3.

F. H. RICHARDS.
WEIGHING MACHINE.

No. 600,044. Patented Mar. 1, 1898.

*Fig. 3.*

Witnesses:
J. G. Hewitt
Henry Bissell

Inventor:
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 600,044, dated March 1, 1898.

Application filed October 19, 1897. Serial No. 655,737. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines of the "rising-poise" class described in Letters Patent of the United States No. 572,067, granted to me November 24, 1896, to which reference may be had, one object of my present invention being to provide an automatic weighing-machine of this class comprehending improved and efficient means for supplying an overload to the receiver or receivers of the weighing mechanism, means for removing the surplus to bring the weighing mechanism to a true poise, and means for effecting the discharge of the true load to constitute a part of the next succeeding load.

A further object of the invention is to provide an improved automatic weighing-machine comprehending a main and auxiliary load-receiver, the latter of which is carried by the former; means for supplying an overload, part of which is delivered to one of the receivers and the remainder to the other receiver; a valve for controlling the discharge of one of said receivers; instrumentalities operative at a predetermined point in the movement of the weighing mechanism for actuating the auxiliary receiver and its valve in proper order and relatively to each other to first discharge the surplus and then the remainder of the material in the auxiliary receiver, and a receptacle situated between the two receivers and in position to receive the surplus.

A further object of my present invention is to provide a weighing-machine embodying a main and an auxiliary load-receiver, the former of which is reciprocatory and the latter of which is carried by and is supported for oscillatory movement in a path transverse to the path of reciprocation of the former.

A further object of the invention is to provide a weighing-machine of this class comprehending improved instrumentalities for controlling the supply of material to the load receiver or receivers and for controlling the discharge of the load from said receiver.

In the drawings accompanying and forming part of this specification.

Similar characters designate like parts in all the figures of the drawings.

The framework for supporting the operative parts of the machine may be of any suitable general construction and is shown consisting of two end frames or columns 2 and 4, mounted upon a chambered supporting-base 3, into which the completed loads are discharged from the main load-receiver or bucket, said columns 2 and 4 being surmounted by the top plate 5 in the usual manner, and which top plate sustains the main supply-hopper H, the construction and organization of which will be hereinafter fully described.

The beam mechanism for sustaining the main load-receiver, which load-receiver is designated in a general way by G, may be of any suitable construction and organization, it preferably consisting, as shown in the drawings, of the counterweighted scale-beam B, fulcrumed on bearings on the side frames, preferably near the upper end of said main load-receiver, and provided with suitable knife-edges on the poising end thereof for supporting said receiver. This beam is shown comprising, as usual, two counterweighted parallel beam-arms located one at each side of the load-receiver and connected at their outer ends by a counterweight $w$. The beam mechanism for supporting the main load-receiver is in all essential particulars substantially the same as the beam mechanism described in the patent hereinbefore referred to. Therefore a detailed description thereof is in the present case deemed unnecessary.

The main supply-hopper H, which may be of any suitable general construction, is shown in the nature of the two-compartment hopper, one of which compartments, which is designated by $c$, is located above and communicates with the other compartment, which is designated by $c'$, said hopper having a series of material conduits or spouts, which are designated, respectively, by 6, 7, and 8. The one 6 constitutes the main supply-spout and is located in position to deliver material to the main load-receiver G. The one 7 constitutes an auxiliary supply-spout and is located with its discharge end above and at one side of the spout 6 and in position to deliver material to the auxiliary load-receiver, which is designated in a general way by $G'$, and the other one, 8, is in the nature of a drip-spout and has its discharge end in vertical alinement with and in position to deliver material to the auxiliary supply-spout 7. The bottom walls 9 and 9' of the main supply-hopper are shown inclined and conjugated to the side walls of the main supply-spout 6.

Figure 3:
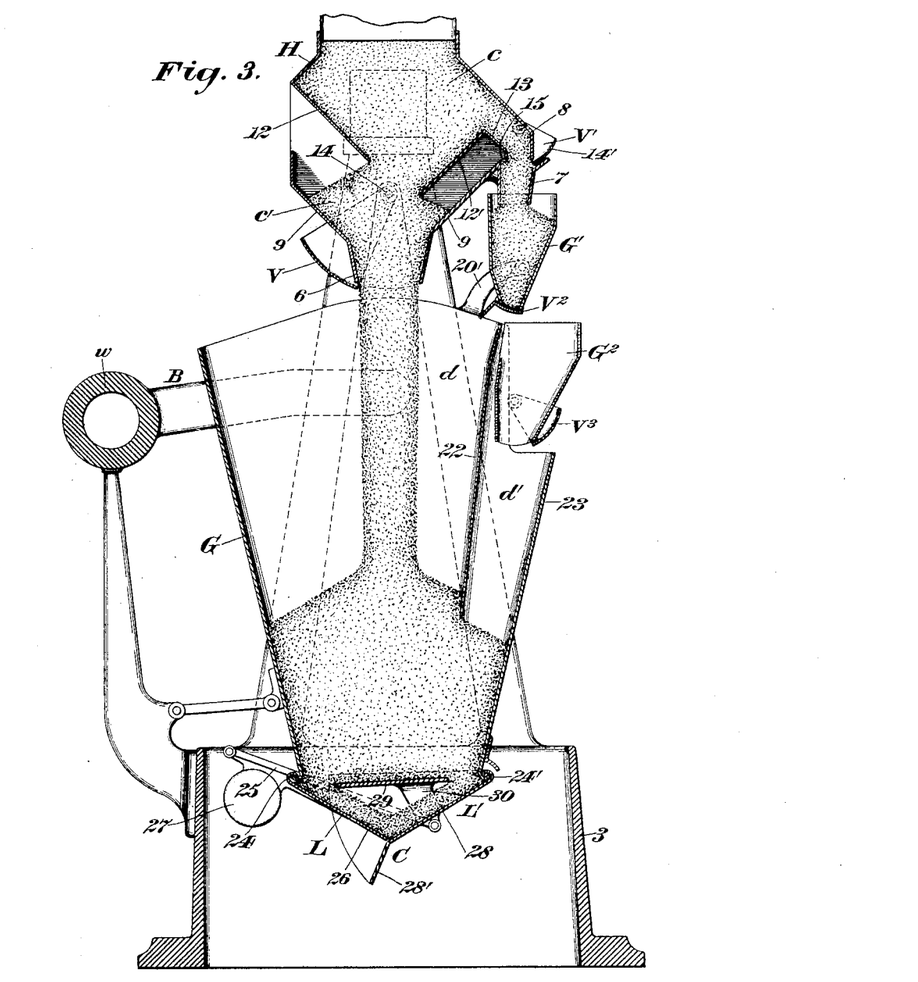
Fig. 3 is a central vertical section of the weighing-machine, taken on the line corresponding to the dotted line *a a*, Fig. 1, as seen from the left in said figure.
Figure 4:
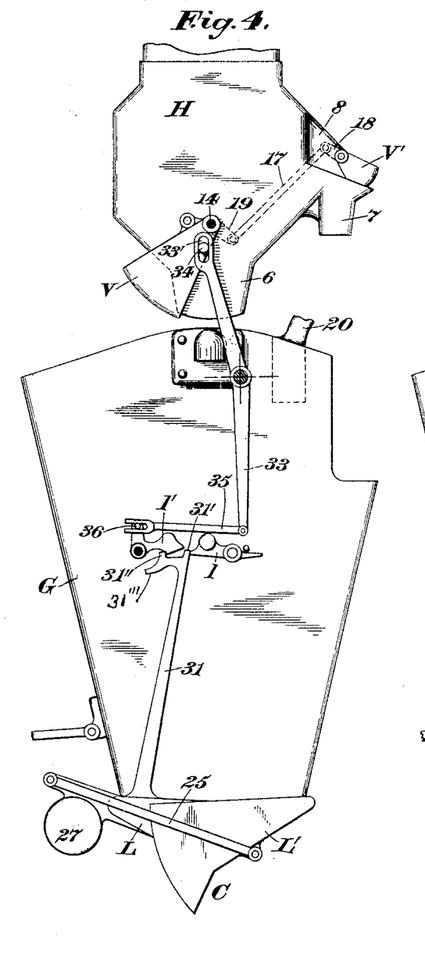
Fig. 4 is a side elevation, partially in section, of a portion of the weighing-machine seen from the left in Fig 1 and showing locking instrumentalities between the main valve of the supply apparatus and the closers of the main load-receiver, parts of the machine being broken away.

The auxiliary supply-spout 7 is shown located at and independent from the upper end of the inclined bottom wall 9' of the supply-hopper, as shown most clearly in Figs. 3 and 4 of the drawings.

The hopper H is furnished on the interior thereof with two oppositely-inclined divided walls or deflecting-plates 12 and 12', which are preferably located in parallelism with the inclined bottom walls 9 and 9' of said hopper and sufficiently remote from said bottom walls as to divide the hopper into the two compartments or chambers $c$ and $c'$. At the upper end of the deflecting plate or partition 12' is a rectangularly-disposed plate or top wall 13, which extends downwardly and outwardly and terminates at a point in close proximity to and above the upper end of the bottom wall 9' of said hopper, this plate 13 constituting the bottom wall of the drip-spout 8, and separates the upper part of the compartment $c'$ from the compartment $c$. The discharge end of the drip-spout 8 is located slightly above the receiving end of the auxiliary supply-spout 7. (See Fig. 3.)

As a means for controlling the supply of material from the main supply-spout 6 to the load-receiver G, I have provided a supply-valve V, which is shown of the usual "oscillatory" type and is pivotally supported at 14 on the framework of the apparatus in the usual manner, and as a means for controlling the supply of material from the drip-spout to the auxiliary supply-spout 7 I have provided an auxiliary supply-valve V', shown pivotally supported on the side walls of the drip-spout 8 and having a cut-off plate 14' in position to oscillate between the discharge end of the drip-spout 8 and the receiving end of the auxiliary supply-spout 7, the range of motion of the valve V' being such that when said valve is closed to cut off the supply of material from the spout 8 to the auxiliary supply-spout 7 the inner end of the plate 14' of said valve will project slightly beyond the inner walls of the two spouts 7 and 8 and into a drip-passage 15 of the compartment $c'$ of the hopper H, this passage being located between the two inclined walls 9' and 12' and being adapted to conduct any material that may be forced inward by the closure of the valve V' to the main discharge-spout 6 of said hopper. By so disposing the drip-spout 7 and by having a drip-passage, as 15, in communication with the space traversed by the valve a closing movement of said valve will tend to force that portion of the material located between the two spouts and in the path of the cut-off plate of valve V' inward and into the passage-way 15, thus insuring a free and unobstructed movement of said valve and preventing the clogging of material between the valve-plate and the two spouts, which would otherwise tend to obstruct the free movement of said valve.

In the organization of mechanism illustrated in the drawings the main valve V is closed by gravity and is opened in a manner similar to that described in the patent hereinbefore referred to through the medium of a valve-actuator or auxiliary beam B', pivotally supported on the scale-beam B in the usual manner, and a thrust-rod 16, supported at its lower end upon the inner end of the valve-actuator and pivotally connected at its upper end to said valve. During the descent of the load-receiver G the inner end of the valve-actuator B' descends in unison with the inner end of the scale-beam B in the usual manner, allowing the thrust-rod to descend and facilitating a gradual closing movement of the main valve V. During the ascending movement of the load-receiver G the valve-actuator is blocked against movement through interlocking instrumentalities hereinafter described and is held in this position until the load is discharged from the load-receiver and the closer, hereinbefore described, of said load-receiver has returned to its closed position, after which said actuator is released, allowing the counterweighted end thereof to descend, which elevates the thrust-rod and imparts an opening movement to the valve V, this operation of the valve and actuator being substantially the same as that described in the aforesaid patents.

Figure 1:
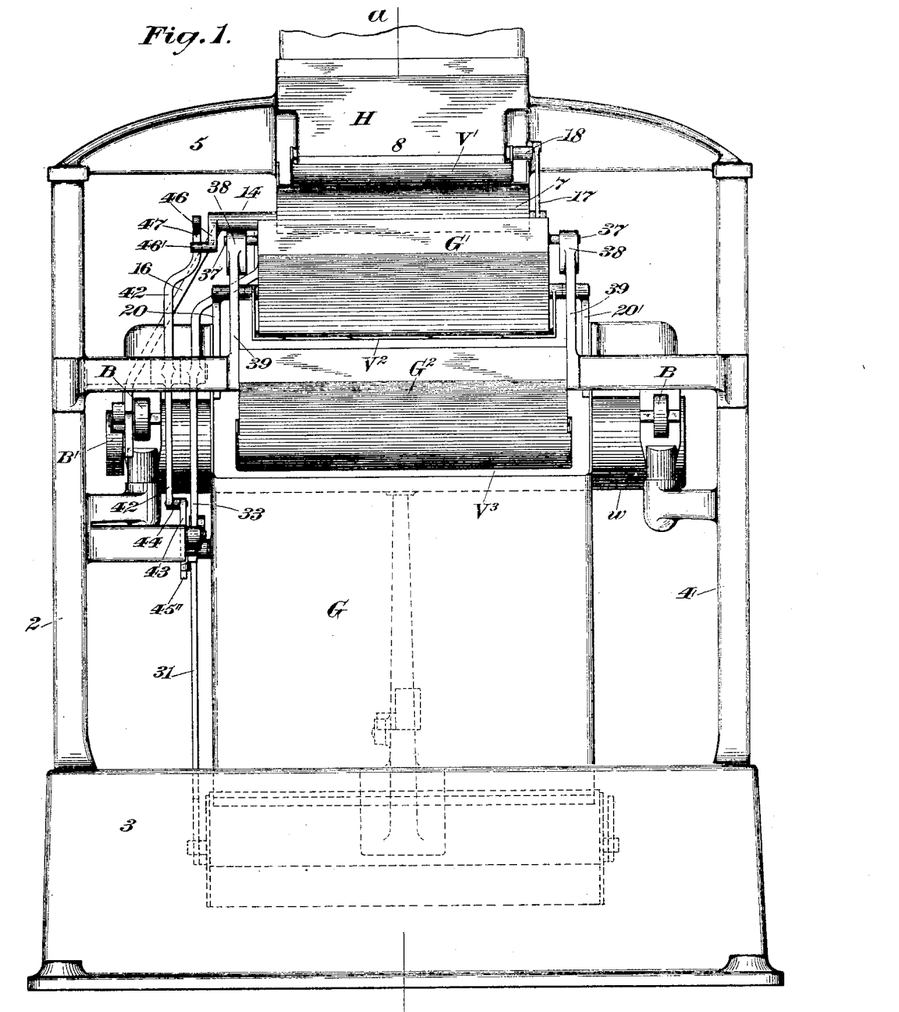
Figure 1 is a front elevation of a weighing-machine comprehending my present improvements.
Figure 2:
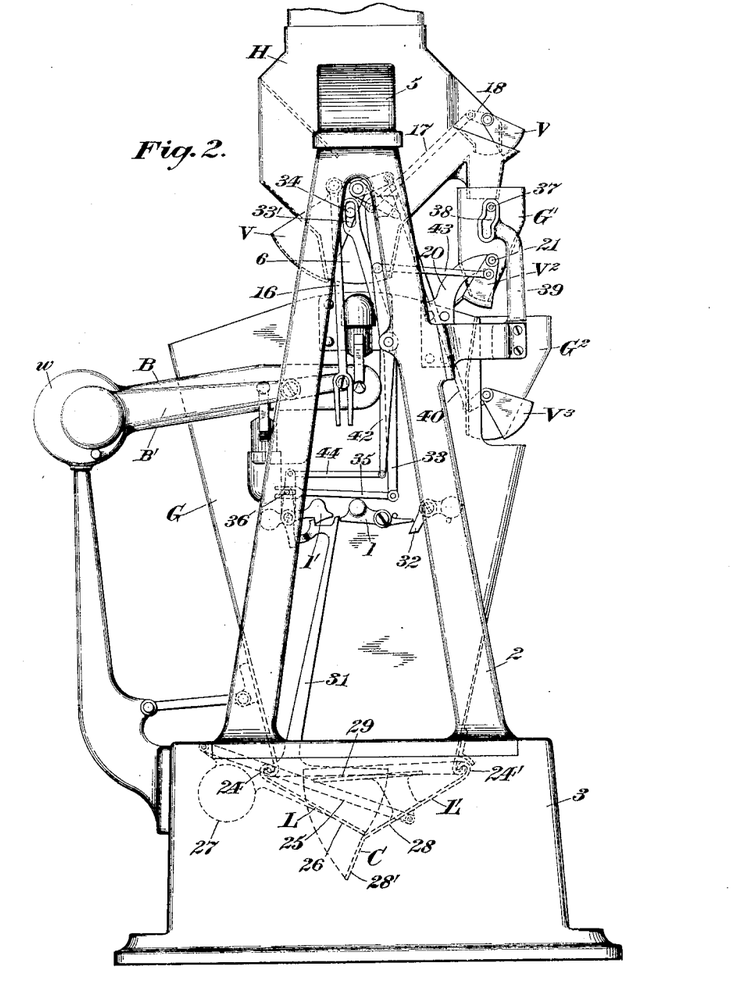
Fig. 2 is a side elevation of the weighing-machine as seen from the left in Fig. 1.

As it is essential that the supply of material through the main supply-spout 6 and the drip-spout 8 be cut off simultaneously, I have provided an actuating-connector between the main valve V and auxiliary supply-valve V', which in the preferred form thereof shown in dotted lines in Figs. 2 and 4 of the drawings comprises a connecting rod or link 17, the upper end of which is pivotally connected to a crank-arm 18 on said valve V' and the lower end of which is pivotally connected to a crank-arm 19 on the main valve V, the disposition of the cranks 18 and 19 being such that on the opening and closing movements of the main valve V a corresponding movement will be simultaneously imparted to the valve V'.

The weighing-machine is shown embodying two load-receivers G G', the former of which constitutes the main load-receiver and is supported upon beam mechanism for vertically-reciprocatory movements, and the latter of which constitutes an auxiliary load-receiver and is supported by and at one side of the longitudinal axis of the main load-receiver and is constructed and organized to have a vertically-reciprocatory movement in unison with the main load-receiver and also an oscillatory movement transversely of the path of reciprocation of said main receiver. This auxiliary load-receiver G' is shown pivotally supported between arms 20 and 20', fixed to and projecting upward from opposite side walls of the main receiver G, the pivotal point 21 of said auxiliary load-receiver being preferably located above and somewhat in advance of the front wall 22 of the main compartment $d$ of the load-receiver G, the purposes of this construction of the auxiliary load-receiver being hereinafter fully explained.

The main load-receiver G, which may be of any suitable general conformation, is shown divided transversely by the vertically-disposed partition or front wall 22 into two compartments $d$ and $d'$, the former of which constitutes the main load-receiving compartment and is located directly beneath the main supply-chute 6, and the latter of which constitutes a surplus-receiving compartment and is located in position to receive the surplus material which is discharged from the auxiliary load-receiver into a surplus-receiver $G^2$, the construction and organization of which will be hereinafter described.

In the form thereof most clearly shown in Fig. 3 of the drawings the front wall 22 of the main compartment of the load-receiver extends from the extreme upper end of said load-receiver and terminates at its lower end at a point somewhat above the extreme lower end of said load-receiver, and the outside wall 23 of the surplus-receiving compartment $d'$ of said load-receiver extends from the extreme lower end of the receiver and terminates at its upper end somewhat below the extreme upper end of said receiver. Thus it will be seen that the surplus-compartment $d'$ communicates at its lower end with the main compartment $d$ of the load-receiver at a point near the lower end of said receiver.

The main load-receiver G is provided at the discharge end thereof with closer mechanism (designated in a general way by C) for controlling the discharge of material from said receiver, and the auxiliary load-receiver G' is provided with a load-reducing valve $V^2$ for controlling the discharge of material thereof to the main load-receiver, and said closer mechanism C and valve $V^2$ are so connected, as it will hereinafter appear, that upon an opening movement of the closer mechanism said valve will have an opening movement imparted thereto for discharging the load contained therein into the receiving-compartment $d$ of the main load-receiver to be discharged therefrom simultaneously with the major portion of the load.

Figure 5:
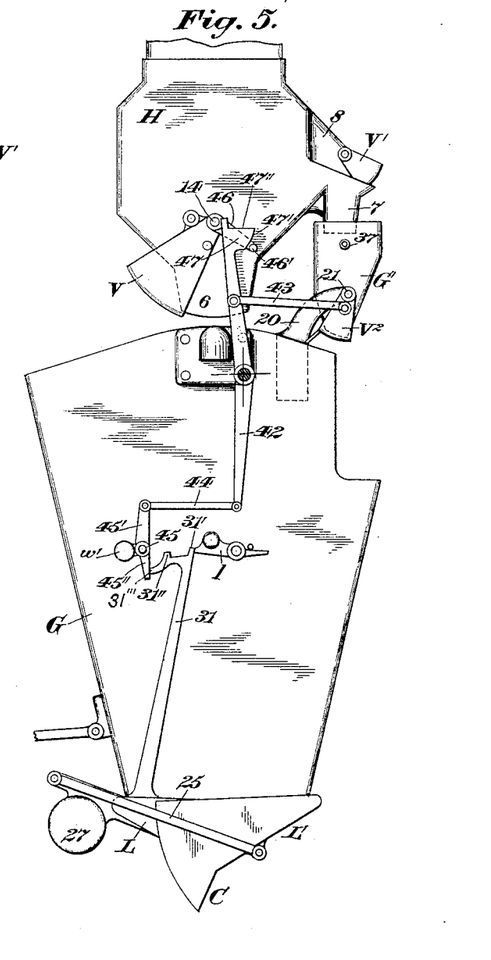
Fig. 5 is a side elevation similar to Fig. 4 of a portion of the weighing-machine, showing the essential instrumentalities for controlling the movements of the valve of the auxiliary receiver.

The closer mechanism in the preferred form thereof shown most clearly in Figs. 3, 4, and 5 comprises two closers, which are designated in a general way by L and L', respectively, which closers are pivotally supported at 24 and 24' on the lower ends of the front and rear walls, respectively, of the load-receiver G, and an actuating-connector 25, pivotally secured at one end to the closer L and at its opposite end to the closer L'. This connector is shown in the nature of a link and is of such angular disposition relatively to the pivotal point of one closer as to constitute substantially a dead-lock toggle for sustaining the weight of the load and preventing the opening movement of one closer, as L', until the other closer L is unlatched, as hereinafter described, and starts to open.

The closer L in the form thereof shown in the accompanying drawings comprises a material-supporting plate 26, preferably having side flanges, and a counterweighted arm 27, extending rearwardly of the pivotal point of and normally exerting a closing stress upon this closer.

The closer L' in the preferred form thereof shown in the drawings comprises a material-supporting plate 28, having side flanges and also having at the inner end thereof a depending regulator-plate 28' for preventing a premature closing movement of the closer, the two plates 26 and 28 of the two closers L and L' being so disposed relatively to each other that when they are in their closed positions, as illustrated in Fig. 3, their inner ends meet at a point below and substantially midway between the pivotal points of said plates.

As a means for sustaining the major portion of the load within the main load-receiver G and relieving the closer-plates 26 and 28 of the weight of such load I have provided a load-supporting platform 29, and, when the closers L and L' are in their closed positions, as shown in Fig. 3, the plane of said platform is substantially horizontal and at right angles to the line of flow of the material. This load-supporting platform is shown in the nature of a flat plate supported by arms 30 on the closer L', said platform in practice being of an area somewhat less than the sectional area of the discharge end of the main load-receiver, so as to allow sufficient space between the edges of said platform and the walls of said receiver as to permit a small amount of material to flow from the interior of the load-receiver to the closer-plates 26 and 28.

For the purpose of normally locking the closers against opening movement the closer L is shown furnished with an upwardly-extending detent-arm 31, which when the closers are in their closed positions has its upper end in bearing engagement with the counterweighted end of a latch $l$, which latch is pivotally supported on the side wall of the load-receiver and is adapted to be actuated at a predetermined point in the ascending movement of the load-receiver by a latch-actuator 32, (shown in the nature of a counterweighted by-pass,) pivotally supported on the framework, with its inner end normally located in the path of movement of the outer end of the latch. This latch and latch-actuator may be of any suitable construction and organization.

For the purpose of locking the closers against premature opening movement in case the latch $l$ should be accidentally tripped during the reciprocatory movements of the load-receiver I have provided a blocking device, which is shown in Figs. 2 and 4, consisting of a supplemental latch $l'$, (shown in the nature of a counterweighted angle-lever,) pivotally supported on the side walls of the load-receiver and having a catch on one arm thereof, which normally engages a projection 31″ on the upper end of the detent-arm 31, and a supplemental-latch actuator 33, comprising a lever pivotally supported on one of the side frames, as 2, of the machine and having an elongated slot 33′ at the upper end thereof, through which extends a pin 34 on the main valve V, and having a link 35, pivoted to the lower end thereof, which link is bifurcated at its rear end and straddles a pin 36 on one arm of the angular supplemental latch $l'$, the construction and organization of the parts of the blocking device being such that during the closing movement of the main valve the lever 33 will be carried with said valve about its axis until the inner wall of the bifurcated end of the link 35 strikes the pin 36 of the supplemental latch and throws the same out of engagement with the upper end of the detent-arm 31, leaving said arm free for movement and permitting an opening movement of the closers when the main latch $l$ is tripped on the arrival of the load-receiver at a predetermined point in its ascending movement.

It will be obvious that the general construction and organization of the closer locking and blocking device may be materially modified without departure from my present invention.

During the operation of the machine, assuming the load-receiver to be in its normal elevated position and the closers thereof in their closed positions, at which time the main valve V and auxiliary supply-valve V′ are in their open positions, material will be simultaneously supplied through the main supply-spout 6 and drip-spout 8 of the supply-hopper H to the main load-receiver G and auxiliary load-receiver G′, respectively, which supply of material is continued until the resistance of the weighing mechanism is overcome by the overload. During the descending movement of the load-receiver the main and auxiliary valves V and V′, respectively, are gradually closed. Owing to the rapidity with which the main and auxiliary receivers are supplied, said receivers will naturally contain an aggregate amount of material slightly in excess of a true load. Therefore it is necessary to reduce this overload to bring the weighing mechanism to a true poise and secure accuracy in the weight of material before the same is discharged from the load-receivers.

As a convenient means for removing the surplus or reducing the overload to bring the weighing mechanism to a true poise the auxiliary load-receiver, which is pivotally supported, as before described, for oscillatory movement transverse to the path of reciprocation to the main load-receiver, is furnished near the upper end thereof with a projection or pin 37, which coöperates with a cam-face 38 on an arm 39, constituting a fixture of the framework of the machine, such cam-face being so disposed that during the descending movement of the auxiliary load-receiver the upper end of said receiver will be tilted so as to throw the discharge end of said receiver outward beyond the material-supporting plate of the valve $V^2$, which normally closes the discharge-opening of said receiver, thus allowing the material in said receiver G′ to fall into the surplus-receiver $G^2$, which is located below and in position to receive the surplus from said auxiliary load-receiver G′. This surplus-receiver is shown in the nature of a receptacle or chute having a valve $V^3$ at the discharge end thereof, which valve is connected by a link 40 with a main valve V in such manner as to have opening and closing movements simultaneously with the opening and closing movements of said main valve. This supplemental receiver is carried on a bracket fixed to the framework and has its discharge end located at one side of the main compartment $d$ of the main load-receiver and in position to discharge the surplus into the surplus-receiving compartment $d'$ of said receiver.

From the foregoing description it will be seen that the main valve V, the auxiliary valve V′, and the surplus-receiving valve $V^3$ are all connected together for simultaneous and corresponding movements—that is to say, the valves V, V′, and $V^3$ are all open when the valve $V^2$ is closed and are all closed when the valve $V^2$ is open, and it will be further seen that during the descending and ascending movements of the main load-receiver opening and closing movements are imparted to the auxiliary receiver relatively to the valves for controlling the discharge of the surplus material to the surplus-receiver G², the volume of material flowing from the auxiliary receiver to the surplus-receiver G being gradually increased during the descent of the main load-receiver and gradually decreased during the ascending movement thereof, until on the arrival of the weighing mechanism at its true-poised position the outlet of the auxiliary receiver will be fully closed.

As a convenient means for actuating the valve V² after the weighing mechanism has arrived at its true poised position to discharge the contents of the auxiliary receiver G' into the main load-receiver G to be discharged therefrom with the balance of the true load I have provided valve-actuating mechanism coöperative with the closer mechanism of the main load-receiver for effecting an opening movement of the valve V² relatively to the auxiliary receiver G' simultaneously with the opening movement of the closers L and L'. This valve-actuating mechanism in the preferred form thereof shown most clearly in Figs. 2 and 5 of the drawings comprises an actuating-lever 42, pivotally supported on one of the side frames, as 2, of the machine and having a link 43, pivotally connected at one end thereof at a point above the pivotal point of said lever and pivotally connected at its opposite end to the valve V², a link 44, pivotally connected at one end thereof to the lower end of the lever 42 and pivotally connected at its opposite end to one arm 45' of a counterweighted stop-lever 45, pivoted on the side wall of the load-receiver and having an arm 45'', which normally engages and is held against movement by a projection 31''' on the detent-arm 31 of the closer L, said detent-arm when the closers are in their closed positions holding the stop-lever in such position as to prevent a valve-opening movement of the lever 42 and facilitating a valve-opening movement of said lever during the opening movement of the closer, the counterweight $w'$ of the stop-lever 45 acting to impart a valve-opening movement to the lever 42 when released by the movement of the detent-arm during the opening movement of the closers. This detent-arm 31 during the closing movement of the closers engages the arm 45'' of the stop-lever and causes said stop-lever to impart, through the medium of the link 43, a valve-closing movement to the actuating-lever 42.

As a means for preventing an opening movement of the valve V² when the main supply-valve V is in its open position and for preventing an opening movement of the valve V when the valve V² is in its open position I have provided in connection with the valve V and the lever 42 two reciprocally-effective stop members 46 and 47, respectively, one of which, as 46, is in the nature of a stop-arm carried on the valve V and has a pin or projection 46' at the outer end thereof in position for coöperating with a stop-face 47' on the stop member 47 when the valve V is in its open position and preventing an opening movement of the valve V², and the other of which is in the nature of an arm or projection carried at the upper end of the lever 42 and having a stop-face 47'' in position for coöperating with the stop projection of the stop member 46 to prevent the opening movement of the valve V when the valve V² is in its open position.

Having described my invention, I claim—

1. The combination, with weighing mechanism including a main receiver and an auxiliary receiver, the latter of which is provided with a valve, of means for supplying an overload, part to one and part to the other receiver; means for actuating the auxiliary receiver and its valve independently and successively to first discharge the surplus and subsequently to discharge the remainder of the load.

2. The combination, with a main load-receiver supported for reciprocatory movement, of an auxiliary load-receiver supported for corresponding reciprocatory movement and for independent movements in a plane transverse to the plane of reciprocation of said receiver; means for supplying an overload, part to one and part to the other receiver; a valve for closing the discharge-opening of the auxiliary receiver; means for shifting the auxiliary receiver relatively to the valve to discharge the surplus outside of said main receiver; and independent means controlled by the weighing mechanism for shifting the valve relatively to the receiver for discharging the remainder of the load into said main receiver.

3. The combination, with weighing mechanism embodying a plurality of receivers, of means for supplying an overload, part to one and part to the other receiver; a valve for controlling the discharge of one of said receivers; means operative at predetermined points in the movement of the weighing mechanism for actuating one receiver and its valve successively and relatively to each other to first discharge the surplus and then the remainder of the load contained in said receiver; and a receptacle situated between the two receivers and in position to receive the surplus from one of said receivers.

4. The combination, with weighing mechanism including a main and an auxiliary load-receiver, of means for supplying an overload, part to one and part to the other receiver; a valve for controlling the discharge from the auxiliary receiver; a receptacle situated between the two receivers in position to receive the surplus from the auxiliary receiver; means operative at a predetermined point in the descending movement of the main receiver for actuating the auxiliary receiver relatively to the valve thereof, to effect a discharge of the surplus into the surplus-receptacle; and means operative at a predetermined point for actuating the valve relatively to the auxiliary receiver to discharge the remainder of the load into the main receiver.

5. The combination, with weighing mechanism including a main load-receiver supported for reciprocatory movement and having a closer, of an auxiliary receiver supported above and at one side of the main load-receiver and having a valve; means for supplying an overload, part to one and part to the other receiver; means operative on the descending movement of the main load-receiver for shifting the auxiliary receiver to discharge the surplus at one side of said main receiver; means controlled by the closer of the main receiver, on the opening movement thereof, for actuating the valve of the auxiliary receiver to discharge the remainder of the load contained therein into the main receiver.

6. The combination, with weighing mechanism including a reciprocatory main load-receiver having a closer, of an auxiliary load-receiver carried by the weighing mechanism and pivotally supported for oscillatory movement in a path transverse to the path of reciprocation of the main load-receiver; means for supplying an overload, part to one and part to the other receiver; means effective on the descending movement of the auxiliary load-receiver for imparting an oscillatory movement thereto to discharge the surplus outside the main load-receiver; and means controlled by the opening movement of the closer for effecting a discharge of the remainder of the load contained in the auxiliary receiver into the main load-receiver.

7. The combination, with weighing mechanism including a main and an auxiliary load-receiver and with means for effecting the discharge of material from the auxiliary load-receiver first outside, and then inside, the main load-receiver, of a surplus-receiver located at one side of the main load-receiver in position to receive a portion of the material from the auxiliary receiver and having a valve; a supply-hopper having a main and a drip discharge-spout, each of which is provided with a valve for controlling the discharge of material to the main and auxiliary load-receiver, respectively; means controlled by the weighing mechanism for actuating one of said valves; actuating-connectors between the main valve, drip-valve, and surplus-receiver valve for effecting corresponding movements of said valves simultaneously; and means for directing the surplus to the main receiver on the opening movement of the surplus-receiver valve.

8. The combination, with weighing mechanism including a main and an auxiliary load-receiver, the latter of which is carried by, and is supported for movement independent of, the other; a supply apparatus including a hopper having a main and drip compartment and having its discharge end in position to discharge material into the main receiver; a main supply-valve located in position to control the supply of material from the main supply-spout to said load-receiver; a drip-spout communicating with the drip-compartment and having its receiving end in vertical alinement with the discharge end of the drip-spout, and having its discharge end in position for discharging material into the auxiliary load-receiver; a valve pivotally supported on the supply-hopper and having a cut-off plate disposed to oscillate between the discharge end of the drip-spout and the receiving end of the auxiliary supply-spout, and adapted to force material located in the path of movement thereon into the drip-compartment of said hopper; and means controlled by the weighing mechanism for imparting corresponding movements to the main valve and drip-valve.

9. The combination, with weighing mechanism including a main and an auxiliary load-receiver, of a supply-hopper having a main supply-spout whose discharge end is located above the main receiver, and also having a drip-spout and an auxiliary supply-spout located one above the other and in position to discharge material to the auxiliary receiver; a drip-passage communicating with the main supply-spout and auxiliary supply-spout; a main supply-valve in operative relation with the discharge end of the main supply-spout; a pivotally-supported drip-valve operative between the drip-spout and the auxiliary supply-spout; an actuating-connector between the main valve and drip-valve; means controlled by the weighing mechanism for actuating the main valve and, through the connector, the drip-valve; and means operative on the descending and ascending movements of the main receiver for discharging material from the auxiliary receiver first to one side of, and then into, the main receiver.

10. A weighing-machine embodying a reciprocatory load-receiver having a main compartment and a surplus-compartment located side by side and communicating with each other at their lower ends; a valve-controlled surplus-receiver having its discharge end in communication with the surplus-compartment; a valve-controlled auxiliary load-receiver carried by the main receiver and pivotally supported for oscillatory movement toward and away from the surplus-receiver; means for simultaneously supplying material to the main and the auxiliary receivers; means controlled by the weighing mechanism for simultaneously cutting off the supply to the main and the auxiliary receivers; and means operative on the descending and ascending movements of the load-receivers for actuating the auxiliary receiver and its valve, successively and relatively to each other, to first discharge material from said auxiliary receiver into the surplus-receiver and then into the main receiver.

11. A weighing-machine embodying a load-receiver having a main and a surplus compartment, of a vertical partition separating said compartments and extending from the upper end of said load-receiver and terminating at a point remote from the lower end of said receiver; a valve-controlled surplus-receiver located at one side of said partition and having an oscillatory valve; an auxiliary load-receiver supported for movement with the main load-receiver and having its discharge end located above, and in position to discharge the material into, the main compartment of said main load-receiver; a valve for closing the discharge end of said auxiliary receiver; means operative on the descending movement of the load-receiver for shifting the discharge end of the auxiliary receiver relatively to its valve and into position for discharging the surplus from the surplus-receiver; means controlled by the weighing mechanism for actuating the valve to discharge the remainder of the load into the main receiver; a supply-hopper having a spout located above the main compartment of the main load-receiver; a valve in operative relation with the discharge end of said spout; means for actuating said valve; an actuating-connector between said valve and the auxiliary-receiver valve; and a valve-controlled auxiliary supply-spout located above the auxiliary receiver; and an actuating-connector between the valve of the auxiliary supply-spout and the valve of the main supply-spout.

12. The combination, with weighing mechanism including a main receiver having a closer and an auxiliary receiver having a valve, of a supply-hopper having a valve-controlled main supply-spout and also having a valve-controlled auxiliary supply-spout; a surplus-receiver located beneath the auxiliary receiver and having a valve; means operative on the descent of the load-receiver for effecting the closure of the valve of the main supply-spout, auxiliary supply-spout, and surplus-receiver simultaneously; means operative on the descent of the load-receiver for shifting the auxiliary receiver relatively to its valve for discharging the surplus into the surplus-receiver; mechanism controlled by the closer of the main receiver, on the opening movement thereof, for actuating the auxiliary-receiver valve to effect a discharge of material into the main receiver; and interlocking instrumentalities constructed and organized to block the opening movement of the main-supply-spout valve when the auxiliary-receiver valve is in its open position, and for blocking the opening movement of said auxiliary-receiver valve when the main-supply-spout valve is in its open position.

13. The combination, with weighing mechanism including a load-receiver having a closer and with a supply apparatus having a main supply-valve, of a detent-arm carried by the closer; a latch normally engaging the detent-arm and holding the closer against opening movement; means for actuating the latch on the ascending movement of the load-receiver, to release the closer therefrom; a supplemental latch carried on the load-receiver and normally engaging the detent-arm of the closer; and means controlled by the main supply-valve at a predetermined point in the closing movement thereof for releasing the supplemental latch from engagement with the detent-arm of the closer.

14. The combination, with weighing mechanism including a main load-receiver having a closer and with an auxiliary load-receiver having a valve, of a valve-actuating lever pivotally supported on the load-receiver and having a link in connection with the auxiliary-receiver valve; a counterweighted stop-lever in operative connection with the valve-actuating lever; a detent-arm carried by the closer and normally engaging the counterweighted stop-lever and holding the valve-actuating lever against a valve-opening movement, and disposed to engage said counterweighted lever to effect a closing movement of the valve on the closing movement of the closer.

15. The combination, with weighing mechanism including a main load-receiver having a gravitative closer and with an auxiliary load-receiver having a valve, of valve-actuating mechanism including a counterweighted stop-arm for imparting opening movements to said valve; means carried by the closer for controlling the valve-opening movements of said actuating mechanism and effective during the closing movement of the closer for directly engaging the stop-arm of, and for imparting to, said valve-actuating mechanism a valve-closing movement; and means for supplying material to the two receivers.

16. The combination, with weighing mechanism including an oscillatory load-receiver having a closer, of an auxiliary receiver carried by, and located above, said load-receiver and having valve-actuating mechanism including a counterweighted stop-lever for effecting an opening movement of the valve; an arm carried by, and effective during the closing movement of, the closer for engaging and imparting closing movement to the counterweighted stop-arm of the valve-actuating mechanism, and for holding the same against valve-opening movement when the closer is in its fully-closed position; a latch normally for locking the closer-arm in its valve-locking position; and means operative at a predetermined point in the movement of the load-receiver for releasing said latch to facilitate an opening movement of the closer and to also facilitate a simultaneous opening movement of the valve of the auxiliary-receiver valve.

17. The combination, with a load-receiver, of closer mechanism comprising two oppositely-disposed closer-plates set relatively oblique, and one of which is furnished with a material-supporting platform, which, when the closers are in their closed positions, lies within the load-receiver in substantially a horizontal plane and supports the major portion of the load; and an actuating-connector between the two closers.

18. The combination, with a load-receiver, of two closers pivotally supported at opposite sides of said receivers, respectively, and one of which closers comprises a substantially flat plate, which, when the closers are in their closed positions, lies in an oblique plane relatively to the horizontal line, and which closer also is furnished with a counterweight, and the other of which closers comprises two obliquely-disposed plates, one of which is located above the other and constitutes a material-supporting platform, which, when the closers are in their closed positions, lies in a horizontal plane and extends over the other closer; and a toggle connecting the two closers.

19. The combination, with a load-receiver, of two closers pivotally supported at opposite sides, respectively, of said receiver and one of which closers includes two relatively-oblique plates, one of which, when the closers are in their closed positions, extends into the load-receiver substantially in a horizontal plane and supports the major part of the material, and the other of which plate is downwardly inclined and is so disposed as to leave a space between the two plates to allow a portion of the material to pass from the load-receiver to the downwardly-inclined plate, and means normally for locking the closers in their closed positions.

20. The combination, with weighing mechanism including a load-receiver, of two relatively-oblique, oppositely-disposed closer-plates having their inner ends in overlapping relation when closed; a material-supporting plate or platform carried by, and above one of, the closer-plates, which platform is so constructed and disposed as to lie substantially in a horizontal plane within the load-receiver when the closers are in their closed positions, and which platform is of an area slightly less than the sectional area of the discharge end of the load-receiver; a dead-lock toggle connecting the two closers; means for normally locking the closers in their closed positions; and means for releasing said closers at a predetermined point in the ascending movement of the receiver.

21. The combination, with weighing mechanism including a load-receiver, of two oppositely-disposed closers pivotally connected to opposite sides, respectively, of the load-receiver and so disposed that their meeting ends, when in a closed position, are below the pivotal points of said closers; a regulator-plate depending from the discharge end of one of said closers; a material-supporting platform carried above, and by, one of said closers and extending over the other closer, and which material-supporting platform is of an area slightly less than the sectional area of the discharge end of the load-receiver and lies substantially in a horizontal plane intersecting the axes of movement of the closers when said closers are in their closed positions; a counterweight carried by one closer and adapted for effecting a closing movement thereof; a link pivotally connecting the closers and having its pivotal points in a line intersecting the axes of one of said closers when the closers are in their closed positions; means for normally locking the closers in their closed positions; and means operative at a predetermined point in the ascending movement of the load-receiver for releasing said closers.

FRANCIS H. RICHARDS.

Witnesses:
FRED. J. DOLE,
JOHN O. SEIFERT.